(12) United States Patent  (10) Patent No.: US 9,092,089 B2
Weishaupt et al.  (45) Date of Patent: Jul. 28, 2015

(54) METHOD FOR DETECTING AN ARBITRARY NUMBER OF TOUCHES FROM A MULTI-TOUCH DEVICE

(75) Inventors: Andreas Weishaupt, Lausanne (CH); Francois Vuadens, Blonay (CH); Norman Chappatte, Estavayer-le-Lac (CH)

(73) Assignee: Advanced Silicon SA, Lausanne (CH)

( * ) Notice: Subject to any disclaimer, the term of this patent is extended or adjusted under 35 U.S.C. 154(b) by 699 days.

(21) Appl. No.: 12/882,715

(22) Filed: Sep. 15, 2010

(65) Prior Publication Data

US 2012/0062474 A1    Mar. 15, 2012

(51) Int. Cl.
*G06F 3/0488* (2013.01)
*G06F 3/041* (2006.01)
*G06F 3/044* (2006.01)

(52) U.S. Cl.
CPC .............. *G06F 3/0416* (2013.01); *G06F 3/044* (2013.01); *G06F 3/0418* (2013.01); *G06F 3/0488* (2013.01); *G06F 3/04883* (2013.01); *G06F 2203/04104* (2013.01); *G06F 2203/04808* (2013.01)

(58) Field of Classification Search
CPC .................................................... G06F 3/0488
USPC ......................................................... 345/173
See application file for complete search history.

(56) References Cited

U.S. PATENT DOCUMENTS

| 5,543,591 | A | 8/1996 | Gillespie et al. |
| 5,825,352 | A | 10/1998 | Bisset et al. |
| 7,656,394 | B2 | 2/2010 | Westerman et al. |
| 7,663,607 | B2 | 2/2010 | Hotelling et al. |
| 8,525,799 | B1 * | 9/2013 | Grivna et al. ................ 345/173 |
| 8,605,051 | B2 | 12/2013 | Hotelling et al. |
| 2006/0238519 | A1 * | 10/2006 | Westerman et al. .......... 345/173 |
| 2007/0262964 | A1 | 11/2007 | Zotov et al. |
| 2008/0087477 | A1 | 4/2008 | Cho et al. |

FOREIGN PATENT DOCUMENTS

| EP | 2077490 A2 | 7/2009 |
| JP | 2006133196 A | 5/2006 |
| JP | 2007533044 A | 11/2007 |
| JP | 2009537051 A | 10/2009 |
| WO | WO-2005114369 A2 | 12/2005 |
| WO | WO-2007133483 A1 | 11/2007 |
| WO | 2009007704 A1 | 1/2009 |

(Continued)

OTHER PUBLICATIONS

International Search Report for CH 1480/2010 dated Jan. 28, 2011.

*Primary Examiner* — Kent Chang
*Assistant Examiner* — Chayce Bibbee
(74) *Attorney, Agent, or Firm* — Blank Rome LLP

(57) ABSTRACT

A method for detecting an arbitrary number of touches from an input image of a multi-touch device comprising the following steps:

processing said input image and obtaining a processed image;

segmentation by thresholding of said processed image (8000) and obtaining a segmented image;

identifying regions of the segmented image;

finding local maxima, each local maximum being of size one pixel on a sub-region inside each region;

determining at least one touch position based on said local maxima.

21 Claims, 13 Drawing Sheets

(56) References Cited

FOREIGN PATENT DOCUMENTS

| WO | WO-2009108334 | A2 | 9/2009 |
| WO | WO-2010036580 | A2 | 4/2010 |
| WO | WO-2010084498 | A1 | 7/2010 |

\* cited by examiner

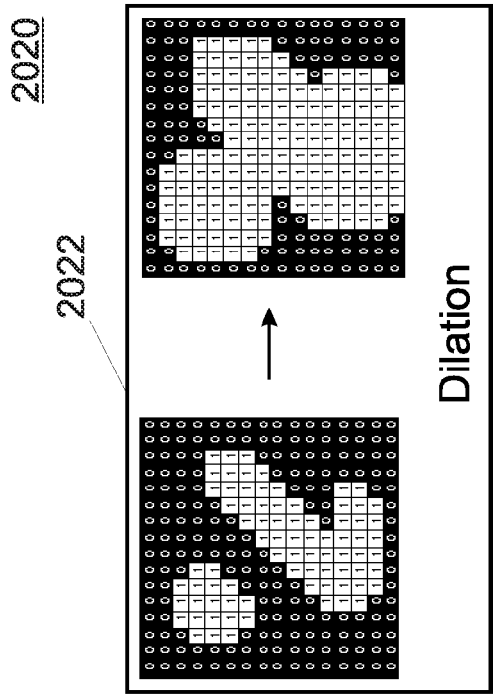
Fig. 7B Dilation
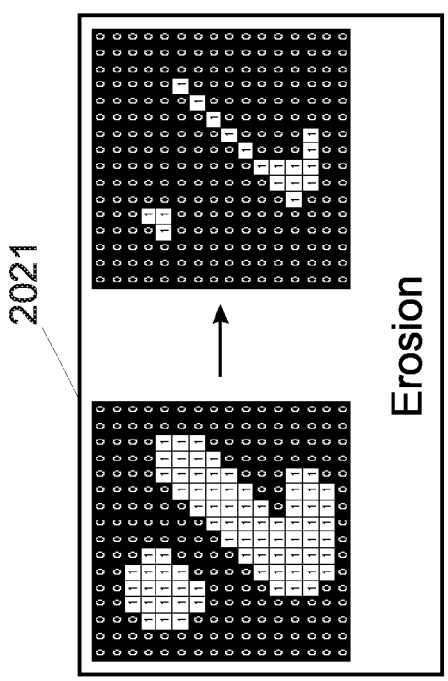
Fig. 7A Erosion
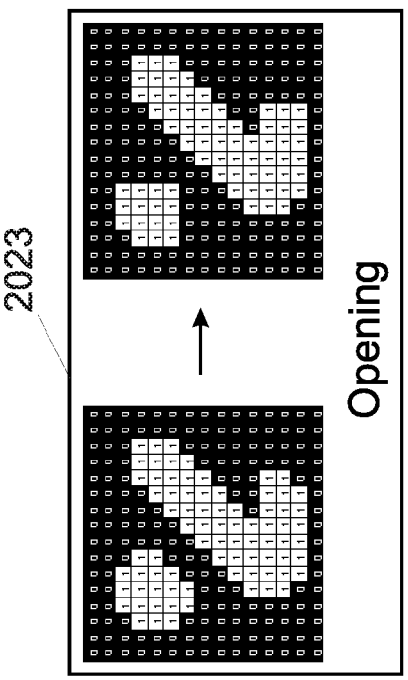
Fig. 7C Opening

METHOD FOR DETECTING AN ARBITRARY NUMBER OF TOUCHES FROM A MULTI-TOUCH DEVICE

FIELD OF THE INVENTION

The present invention concerns a method for detecting an arbitrary number of touches from a multi-touch device. This method can allow also the tracking of the detected touches and the gesture recognition.

DESCRIPTION OF RELATED ART

The present invention can be implemented based on any touch sensing technology, although an exemplary embodiment involves the use of a capacitive sensing device comprising:
 an array comprising a first number of rows and a second number of columns of sensing capacitors;
 means for generating an input signal and for addressing said input signal to each of the rows at a row scan rate second number of circuits.
 In a preferred embodiment this circuit comprises
 a low pass-filter
 a correlated double sampler comprising an input capacitor
 a sampler and holder
 an analog to digital converter
 the low pass-filter comprising the input capacitor and a serial resistor.
 In other words the circuit integrates in one block the low pass-filter and the correlated double sampler.

Multi-touch devices are devices capable of detecting the contact or proximity of several objects, e.g. fingers, at the same time. Example of known multi-touch devices are based on capacitive sensors and may be used in various equipments such as, but not limited to, a capacitive touch pad, a capacitive touch panel, a capacitive touch screen or a projective capacitive display. Capacitive-based touch devices are generally formed by an array of capacitors. If an object with good dielectric properties, e.g. a finger, is approaching the device, the capacitance of the underlying capacitors is changed. The whole array can be read out by a Capacitive Sensing Integrated Circuit (CSIC) in medium speed, typically 100-1000 fps. The digital output of such a circuit is a gray-scale image sequence wherein the pixels correspond to the digitalized capacitance values.

The present invention relates to a method for processing this sequence of images in order to compute the position of an arbitrary number of touches and to track them through the sequence of images. The method can also allow gesture recognition.

A multi-touch method, as illustrated in FIG. 1, normally can be used in order to process the digital output of a CSIC connected to a capacitive touch panel 200. A multi-touch method could for example comprise the following steps: calibration plus image pre-processing 1000, image segmentation and analysis 2000 and tracking 3000. An alternative is to combine the image segmentation and analysis 2000 with the tracking 3000 in one step by using block-matching/KLT (Kanade-Lucas-Tomasi) tracking or other similar known techniques. However, such approaches require quite clean input images, i.e. input images with reduced noise, having a good resolution. The output of the method shown in FIG. 1 can be transmitted, via a USB connection, to a host 5000.

There is a need for an improved method allowing a robust and fast multi-touch detection/tracking, including a method which is not limited by the number of fingers/trajectories and which allows a precise position determination, suitable for applications requiring low overall processing requirements aiming at a hardware implementation of the touches' detection.

U.S. Pat. No. 5,543,591 (Synaptics) describes a method for detecting touches on a touch-sensor pad wherein the touches' position is calculated in both the horizontal (x) and vertical (y) directions by evaluating the weighted average of the capacitances measured on the individual sense lines of the touch-sensor array (geometric center computation). This method does not allow a true multi-touch detection, since it is not robust when multiple fingers are present. The method comprises the tracking of a single detected touch only for a specific simple gesture, such as a tap, i.e. an up and down motion, double tap and other similar. The tracking and gesture recognition are closely linked, but they are related to a very specific implementation which cannot be easily extended.

U.S. Pat. No. 5,825,352 (Logitech) describes a method for detecting an operative coupling between one or more well aligned fingers and a touch pad. After a noise suppression and a calibration phase, the spatial finger profile is scanned and the input x-profile and y-profile are extracted. In the case of two fingers, for example the index and the medium, a first maximum, indicative of a first finger in the finger profile, is followed by a minimum, indicative of the space between the fingers, and further followed by another maximum, indicative of the second finger. Since the fingers have to be aligned, for avoiding artifacts a threshold can be applied to the distance between the two maxima. The touches position is determined by calculating a single centroid value, defined as the midpoint of the two maxima. The described method is not robust to noise. Moreover the position determination is not very precise and there is not multi-touch detection if the touches are not well aligned. Moreover the method fails when more than three fingers are present on the touch pad at the same time. The document discloses a multi-touch tracker, closely linked to the gesture recognition, wherein the left-most or the right-most touch is used as a pointer and the remaining touches, if any, are used for simple gesture recognition.

U.S. Pat. No. 7,663,607 (Apple) describes a method for multi-touch detection, wherein the touch position determination is performed by filtering the whole input image and then finding touch regions based on their boundaries: gradient data indicating the topology of the input image are computed and touch region boundaries are calculated based on the gradient data (the output of this boundaries computation is a binary topology image, i.e. an image that contains 0 everywhere except at the boundaries where there are 1), then, by using a watershed algorithm, touch regions are determined from the boundary data (the output of this watershed transformation is a regions' image, i.e. an image containing 0 everywhere except at the interior of closed boundaries, i.e. the touch regions). The touches position determination is accomplished by performing a centroid calculation with the data associated to each touch region. The described method needs very high processing requirements compared to the known solutions and, for this reason, it is not suited for hand/stylus-writing/painting applications. Moreover it is limited by the number of touches and/or persons using the device, since it is not designed for more than ten fingers.

WO2009/007704 (Atmel/QRG Limited) describes a multi-touch detecting method wherein, after the determination of the sensing element having the largest capacitance signal value, a region around it is defined. The method repeats these two steps iteratively, by excluding in each subsequent step the signals present in previously defined regions. The method uses a modified implementation of Adjacent Key Suppression. Again, this method requires very high processing requirements compared to the known solutions. Moreover it is not precise and an interpolation between the adjacent signal values is required for determining more accurately the touch location in each region. The touch tracking is based on a computation of the path length of all possible paths between the touch locations determined at two different times. The total distance for each of the combinations is then found and the combination with the lowest distance value represents the smallest tracking distance for the considered objects and therefore the most likely combination of tracking for these objects. The tracking steps require a high number of computations, especially in the presence of a high number of objects. Moreover the tracking part of this method is not precise.

US2008/0087477 (Samsung) describes a multi-touch method comprising a step of detecting whether a single or multi touch has been sensed based on the number of sensing channels having the signal strength exceeding a threshold. If the number of sensing channels exceeds a second threshold (e.g. three), a controller decides that the operation is based on a multi-touch sensing. This method is not precise and not robust in the presence of false detections. The tracking is not mentioned.

U.S. Pat. No. 7,656,394 (Apple) describes a multi-touch tracking method wherein a high number of parameters, e.g. 16 parameters, is tracked reliably by using advanced but computationally expensive Digital Signal Processing (DSP) steps, such as ellipsis fitting on touch regions, fuzzy pattern recognition and assignment problems for hands and fingers identification. The method in other words needs very high processing and memory requirements compared to known solutions. The gesture recognition is based on the combination of a motion parameters analysis and bitmasks. However it is not flexible and most of the tracked parameters are useless for the gesture recognition. Moreover the method does not work properly for more than two hands or for more than one person.

Therefore, a method for detecting an arbitrary number of touches from a multi-touch device robustly, precisely and independently from the fingers' alignment is needed.

A method for detecting an arbitrary number of touches not limited by the number of touches to be detected and suited also for hand/stylus writing/painting applications is also needed.

A method for detecting and tracking an arbitrary number of touches with lower overall processing requirements compared to the known solutions is also needed.

A method for tracking an arbitrary number of touches not limited to the number of tracked touches and suited for use by more than one person or more than two hands is also needed.

A method for tracking an arbitrary number of touches allowing a flexible gesture recognition, i.e. a recognition of any kind of gesture with any number of fingers, is also needed.

BRIEF SUMMARY OF THE INVENTION

According to the invention, these aims are achieved by means of method for detecting an arbitrary number of touches from a multi-touch device, by means of a non-transitory, tangible computer readable medium and a multi-touch equipment according to the claims.

The advantages of the disclosed method, comparing with the prior art, include in particular the possibility of having a "true" multi-touch detection without any limitation regarding the number of touches, and which requires lower overall processing requirements compared to known solutions.

Advantageously the method according to the invention can allow hand/stylus writing/painting applications.

The method can allow a robust multi-touch tracking without any limitation regarding the number of tracked touches, and which is also suited for use by more than one person.

Advantageously the method according to the invention can allow a flexible gesture recognition, since it is possible to recognize any kind of gesture with any kind of fingers.

The method according to the invention is fast when compared to other state of art approaches: the speed of touch detection has a negligible dependence on the number of touches. Moreover it is robust with respect to the quality of the input data: advantageously input data with a poor quality, i.e. with high noise level and low resolution, can be well handled by the disclosed method.

BRIEF DESCRIPTION OF THE DRAWINGS

The invention will be better understood with the aid of the description of an embodiment given by way of example and illustrated by the figures, in which:

FIG. 3A shows an example of a local maximum test on a 3×3 sub-region principle.

FIG. 3B shows the found local maxima and the other types of maxima.

FIG. 7A to 7C show one embodiment of the basic binary morphological operations, with 3×3 square pixel structuring element, required in the binary image filtering step of the method according to one embodiment of the invention.

DETAILED DESCRIPTION OF POSSIBLE EMBODIMENTS OF THE INVENTION

Figure 1:
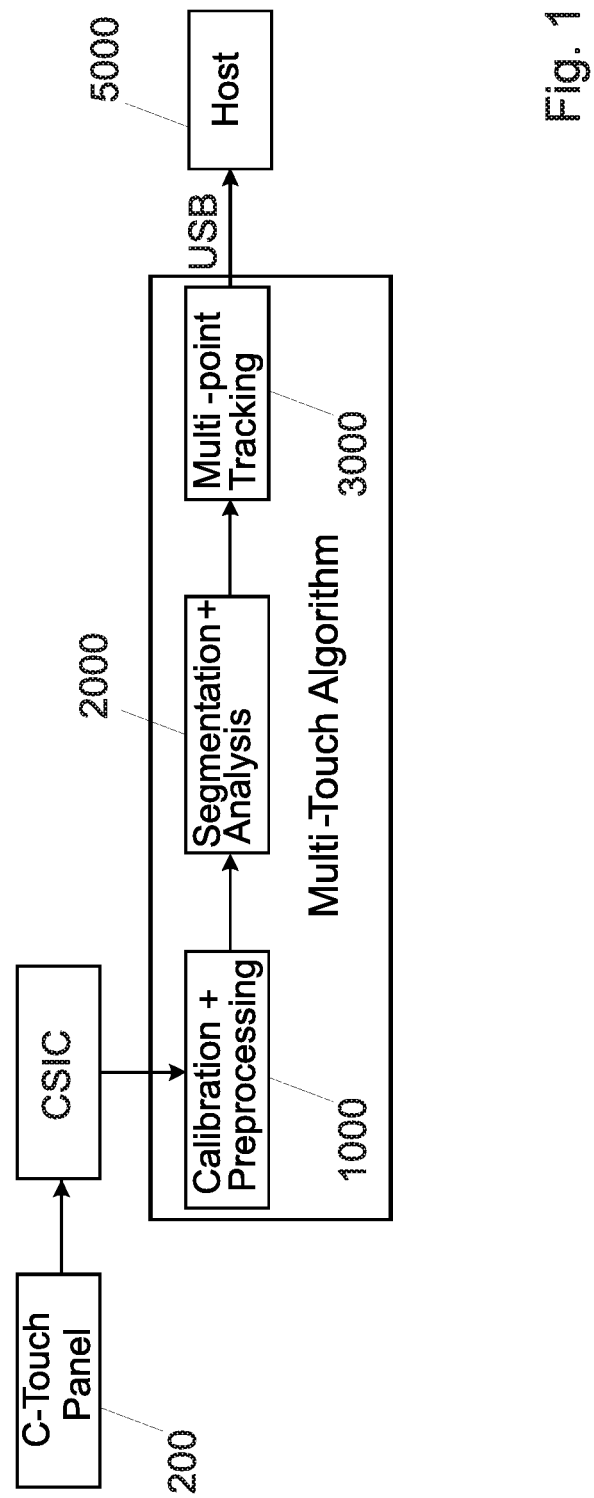
FIG. 1 schematically shows a view of the main steps of a multi-touch method.
Figure 2:
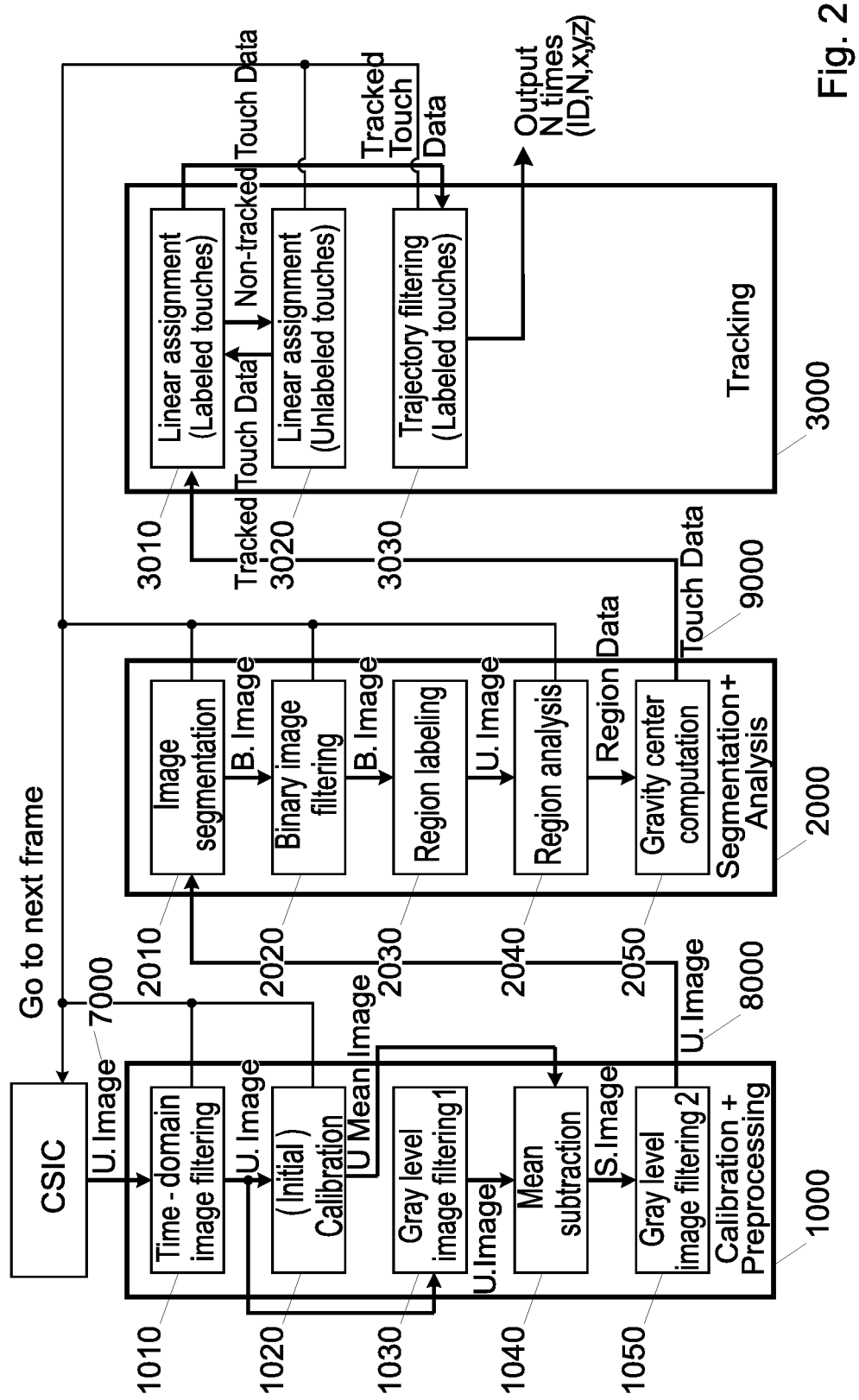
FIG. 2 shows a simplified flowchart of the method according to one embodiment of the invention.

FIG. 2 shows the flowchart of the method according to one preferred embodiment of the invention. An image output by a Capacitive Sensing Integrated Circuit (CSIC) of a multi-touch device, for example a 16-bit image, is used as input image 7000 of the first calibration plus pre-processing block 1000. This input image is unsigned, i.e. does not contain negative pixel values. The first block 1000 is followed by a segmentation plus analysis block 2000 and by a tracking block 3000. These blocks are processed for each frame of a sequence of input images.

In this context the noun "block" means a functional unit for providing functions. A block can be implemented with hardware components and/or with software components.

In this context the expression "image" designates the bi-dimensional representation of the state of the multi-touch device, such a binary or multivalued representation of the charges in each of the sensing capacitors of the device. An image is not necessarily something that is displayed or intended to be displayed.

The output of the tracking block 3000 comprises N vectors, each vector of the form (N, ID, x, y, z), wherein N is the number of touches present at one moment on the multi-touch device ID is a number identifying a specific touch x and y are the plane coordinates of the touch location of the touch corresponding to the ID z is the touch intensity, i.e. a value proportional to the change of electrical field due to presence of an object on or in proximity of the multi-touch device. In other words the touch intensity z is proportional to the distance of an object to device and the object's equivalent dielectric constant or conductivity.

An initial calibration 1020 for obtaining a zero-touch reference image, or baseline or baseline image, together with mean subtraction 1040, i.e. subtracting the input image 7000 with said baseline image, allows extracting differential and signed images where touches can be well localized. A signed image can contain both negative and positive pixel values. Steps 1020 and 1040 additionally permit to well equally detect touches even if the zero-touch reference raw image is "non-uniform" as in the ideal case, i.e., even when the reference image contains different grey values although there are no objects on the multi-touch device.

Three filtering blocks 1010, 1030, 1050 can be used for cleaning up highly corrupted images:

Time-domain filtering 1010 is mainly based on non-recursive, fast averaging in order to filter white noise, mainly composed by system and ambient noise.

A first gray level image filtering block 1030 filters sharp noise, such as 1-pixel noise, mainly introduced by finger induced coupling on the multi-touch device. It comprises also a smoother for restoring monotonicity of the true touches.

A second gray level image filtering block 1050 can filter strong perturbations, e.g. due to display or ambient/system 50 Hz noise.

After these steps of processing the input image 7000, a processed image 8000 is obtained, which is used as input of the segmentation plus analysis block 2000. The first step of the block 2000 is the image segmentation 2010 performed with a constant threshold in order to split the processed image 8000 into foreground, i.e. touches+residual noise, and background. One or a plurality of regions is then identified in the processed image. In one preferred embodiment, a region is a connected group of pixels which can correspond to one touch, for example a group of connected pixels all having a value above a predetermined threshold. The meaning of "connected" in the expression "connected pixels" is related to the concept of N-connected neighbourhood or adjacent pixels, where N is a even integer number. In one preferred embodiment N=4. In this case if N/2, e.g. two, neighbouring or adjacent pixels are on the same row—or on the same column—and if they have a value above the predefined threshold, they belong to the same region, i.e. they are N-connected, e.g. 4-connected.

A binary image filtering 2020 removes binary noise such as loose or not meaningfully regions.

Region labeling 2030 is performed to obtain the coordinates of the identified regions that remain after this filtering. The labeled regions are then analyzed at step 2040 for area, square shapedness and number of local maxima.

In this context the expression "square shapedness" means how square the region is. This is evaluated by surrounding a region of any shape with a rectangle of given width (width$_R$) and height (height$_R$) and by computing a squared shapedness factor defined as $$\text{Min}(\text{width}_R, \text{height}_R)/\text{Max}(\text{width}_R, \text{height}_R)$$

In this context the expression "local maximum of size one pixel" indicates a maximum, i.e. a pixel in which the touch intensity z has a maximum value. This maximum is "local" because it is evaluated in a sub-region inside a region. In one embodiment this sub-region is of size N×N pixels, wherein N is an odd integer number. In one preferred embodiment N=3.

The main problem with the numerical determination of a local maximum is that it does not have to be forcibly a single pixel, but it can be distributed on more than one pixel. Looking for local maxima of arbitrary size would be computationally expensive and implies generally the computation of gradient images (spatial derivatives) and a lot of processing steps to clean up and use the derivative images. The method according to the invention advantageously restricts the search of local maxima to local maxima of size 1 pixel, making it very easy and computationally inexpensive to find them. The method is based on the discovery that such a restriction allows for a very important reduction of the processing power, without any significative deterioration of the reliability of touch detection. In fact, the improved method of the invention reduces the number of false positive detections, and does not significantly increase the number of undetected touches. This is due, in part, to the fact that the sub-regions having a local maxima greater than one pixel are usually only temporary, and are usually replaced after a few frames by sub-regions with a local maximum of size one pixel.

All the filtering steps 1010, 1030, 1050, 2020 performed before the local maxima search guarantee that with a very high probability a finger on the multi-touch device corresponds to a local maximum of size 1 pixel. The method according to the invention then requires no derivatives, no derivative post-processing and therefore requires quite low processing requirements if compared to other methods of the state of the art.

Figures 3A, 3B:
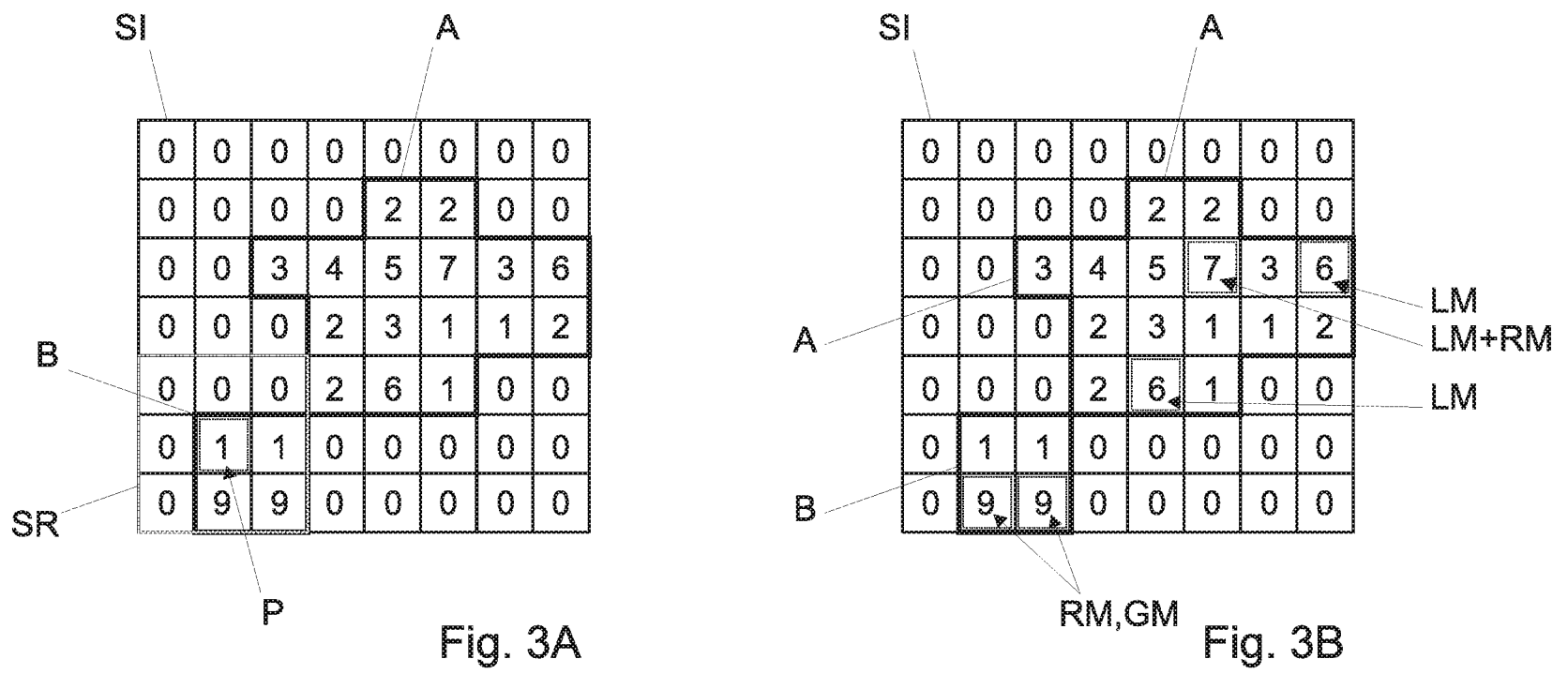

FIG. 3A shows an example a segmented image SI comprising two regions A and B. Each region comprises pixels, each pixel having a value different than zero and proportional to the touch intensity z. A sub-region SR is centred on each pixel on each region. In the example of FIG. 3A this sub-region is of size 3×3 pixels. The pixel in the center of the sub-region SR, i.e. the pixel under test, is a local maximum if the other 8 pixels inside the sub-region have a value lower than the value of the pixel under test.

In the example of FIG. 3A the pixel P of the region B is under test. Since between the other 8 pixels inside the sub-region SB there are two pixels which have a value, 9, higher than the value 1 of the pixel P, P is not a local maximum of size one pixel.

Each of the two pixels of the region B having value 9, for the same reasons, is not a local maximum, since between the other eight pixels inside the sub-region centred in each of these two pixels there is a pixel which has a value, 9, which is the same than the value the pixel under test.

Since the region B does not'contain local maxima of size one pixel, it is discarded. However the example of FIG. 3A shows an arrangement of pixel inside the region B which is normally unusual, since it is infrequent to have two neighbour pixels having the same and a high value.

The two pixels of region B having the value 9 mathematically are a local maximum of size two pixels. They are also regional maximum RM for the region B, since they have the highest value inside the region B, and global maximum GM, since they have the highest value of all pixels of the segmented image I. The different types of maxima are illustrated in FIG. 3B.

According to FIG. 3B, there are three local maxima LM of size 1 pixel in the region A: two local maxima of size one pixel have value 6, and a local maximum of size one pixel has value 7, which is also a regional maximum RM for the region A.

The method according to the invention determines touches positions based on the found local maxima of size one pixel. As discussed, if a region does not contain at least one local maximum of size one pixel, the whole region is discarded. If it contains one local maximum of size one pixel, the touch position is determined by computing the geometric center of this region using all the pixels of the region. If there are more than one local maxima of size one pixel, only the 9 pixels inside the sub-regions centred on each local maximum are considered for the geometric center computation.

Some regions are discarded according to predetermined conditions, based on their area, their square shapedness factor and/or, as already mentioned, the number of the local maxima found within the region.

For example large regions, regions which are far from being square shaped or which have many local maxima are very likely to be false touches and are thus rejected. If one region is very large or if there are several large regions, it is very likely that there is a big object on the multi-touch device, for example a hand, an ear etc. In such a case the method according to the invention is stopped. It is also possible to discard some regions based on the position of the local maxima within the region (we expect them to be more or less centred), on the position of the region within the image (some regions might be more likely candidates, other might be prohibited, or temporarily prohibited), on previous or subsequent images (most touches last at least a few frames), etc. It is also possible to compute a probability that a region is a false touch and should be discarded, based on a plurality of conditions and pondering factors.

If the method continues, the geometric center of each valid region is computed at step 2050 according to some well known formula.

After these steps the touches positions 9000 are determined. All valid touches are then submitted to linear assignment 3010 with already tracked (labeled) touches. Successfully labeled touches can be fed forward to trajectory filtering 3030 and then output. Trajectory filtering is performed by a simple, short, low-pass filter.

Not-assigned touches will be fed forward to linear assignment 3020 with tracked (but unlabeled) touches. The unlabeled touches are very likely to be false positives if they are not successfully assigned during several frames and are thus eliminated. However, if an unlabeled touch is assigned successfully for multiple frames, it is very likely that it is a true touch and therefore it becomes labeled as well.

Finally, recalibration can be performed if wanted/needed. The main reason requiring to have dynamic recalibration is due to grease, sweat or liquid (rain) remaining on the multi-touch device and maybe due to environment E-field change.

The ID outputted from the method has to be constant from the first finger contact, during movement until release of the same finger. The coordinates x and y should be as precise as possible with respect to the real-world touch position relative to the multi-touch device.

The whole method can be implemented in hardware, firmware or software, or a mix.

The blocks up to and including binary image filtering (1010 to 2010) would be suited for partially up to fully parallel (pixel-wise) processing. Computation time inferior to 1 ms is possible even in the presence of a large cost matrix computed in the block 3000 as will be discussed.

If there are no touches or if there is a large object on the multi-touch device the method ends and therefore the computing activity is reduced. Additionally, the number of cycles per second of the method can be reduced dynamically to a minimum depending on the situation and application: lowest frequency possible to guarantee maximum latency requirements in an idle mode, low frequency (10-25 Hz) for soft-keyboard applications (phone dial, typing, menu selection, etc.), average frequency for pointing (cursor) and multi-touch applications (25-50 Hz) and high frequency for hand/stylus writing/painting applications (50-200 Hz).

Figure 4:
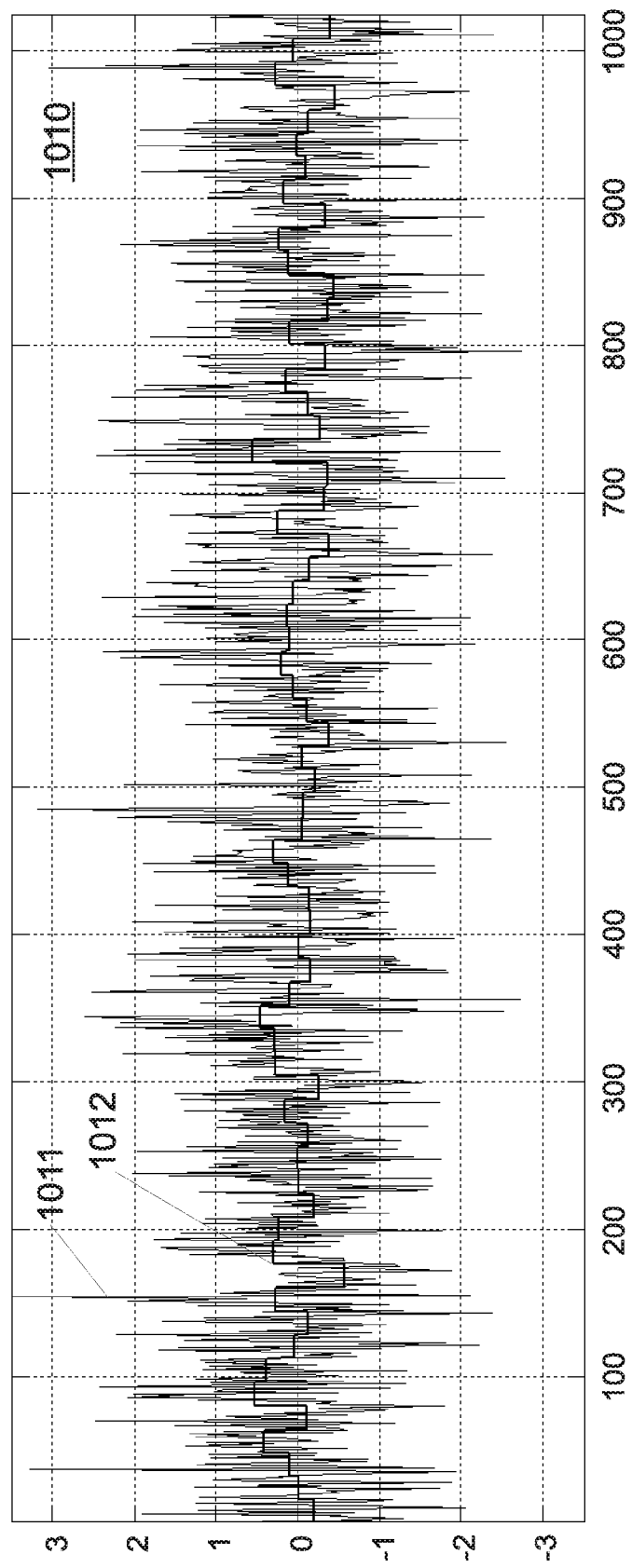
FIG. 4 shows an example of a time domain filtering, with true averaging on non-overlapping windows.

During the time domain filtering 1010 the evolution of each pixel's signal of the input image 7000 is filtered in time, in order to suppress high-frequency content, i.e. content with a frequency higher than 100-200 Hz. However a specific filtering of stationary signals (e.g. 50 Hz) could be achieved as well. The time domain filtering 1010 can be realized in various ways, known in the digital filtering techniques and digital filter design domain (Finite Impulse Response and Infinite Impulse Response filters). FIG. 4 shows an example of a non-running and non-recursive time domain filtering with true averaging over multiple input frames without overlapping windows. The average is true with regard to the window because it's computed with an arithmetic average formula, in contrast to obtain an approximated average by means of a low-pass filter. The reference 1011 indicates a signal of a predetermined length, in this case N=1024, and the reference 1012 the true average on overlapping windows of size W=16. The size corresponds to the length of the horizontal parts of the signal 1012.

The initial calibration 1020 is performed similarly to time domain filtering 1010 in order to obtain a baseline image $I_{ref}$. Therefore, the calibration should be performed without any object remaining on the multi-touch device. A true average on a large number of frames is computed for obtaining a baseline image $I_{ref}$ which is then stored in a reference image buffer. If calibration has to be repeated from time to time, the stored baseline image can be updated with a new time domain filtered baseline image $I_{ref\_new}$ by weighted averaging with a strong weight a on the old baseline image $I_{ref\_old}$. The update method is again a time domain filtering. The updated (time domain filtered) baseline image is then $$\alpha I_{ref\_old} + (1-\alpha)I_{ref\_new} \text{ where } 0<<\alpha<1$$

If, at the initial calibration step 1020, there is no guarantee that there are no conductive objects on the multi-touch device, some heuristic methods can be used for determining if the baseline image is "uniform" or "sparse" enough. If not, calibration can be repeated until the desired uniformity or sparseness is reached. Some possible heuristic methods, that can also be combined, are:

Compute the standard deviation together with the average magnitude of the baseline image. Once it is "small enough", it is very probable that there is no movement on the multi-touch device. The meaning of "small enough" is determined experimentally.

Compute the total variation norm, i.e. the L1 norm of the spatial derivative of the baseline image. If it is "small enough", the image is uniform. Again, the meaning of "small enough" is determined experimentally.

The second heuristic proposed method is more fast and reliable but, given the coarse resolution of the input images 7000, special care has to be taken when discretizing the spatial derivatives.

Further to the time domain filtering 1010 and calibration 1020, the time domain filtered images are processed in order to obtain a good estimate of the true x-y plane coordinates of the true touches on the multi-touch device on each frame.

The main difficulty for multi-touch detection is that the number of true touches on the multi-touch device is not imposed nor known in advance. Therefore, the input image 7000 has to be processed to reliably obtain the regions, i.e. connected group of pixels which can correspond to each of the different touches.

Coupling between sensing capacitors by multiple finger contact with a not completely known coupling model introduces one of the following effects on the input images:

On one side of the multi-touch device (bottom face) it introduces "ghost touches" which are quite of the same intensity and area as the true touches.

On the other side of the multi-touch device (upper face), the ghost touches are apparent as well, but of weaker intensity and of opposite sign.

In general, the up side is used even if the bottom side has some advantages when compared to the up side. For already assembled multi-touch devices, e.g. already packed into a frame, it is difficult to flip the screen since it is necessary to disassemble the whole setup, flip it and re-assemble again. In these cases the up side is generally used. In the case it is possible to decide upon which side to use, the bottom side allows to obtain huge signal-to-noise ratios. The advantage of the bottom side is that image filtering can be significantly reduced, however there is the ghosts' problem to solve with an appropriate algorithm.

Since small peaks of opposite sign may, due to some other sources of noise, become true noise peaks, those small peaks are filtered by a first gray level image filtering 1030 by using a median (column) filter, for example a 1×3 pixel median filter.

Figure 5:
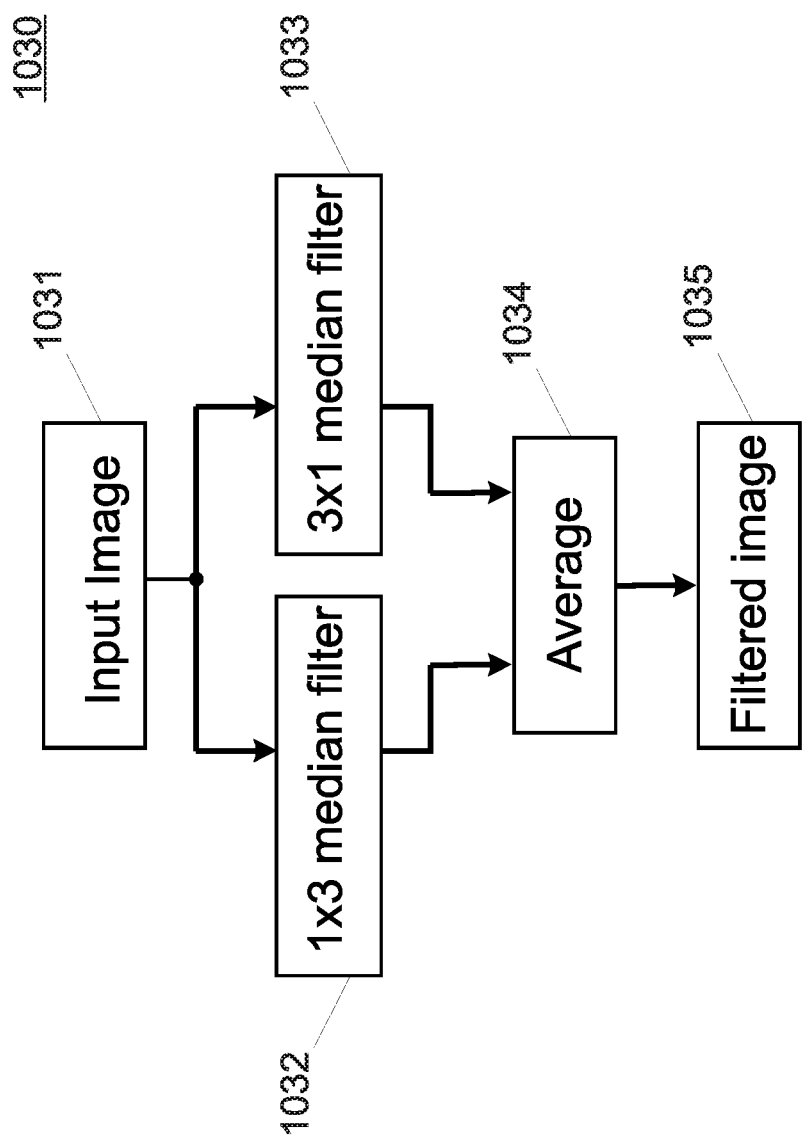
FIG. 5 illustrates one embodiment of the first gray level image filtering step of the method according to one embodiment of the invention.

Since median filtering is non-linear, it is not separable, i.e. a second run on the rows cannot be performed without introducing substantial loss of information or distortion. An alternative would be to apply a 2×2 pixel median filter but in general non-binary image filtering with masks of an even number of pixel is avoided because there is no filter center. If a 3×3 pixel median filter is used, it is very likely to delete most of the true touches given the coarseness of the input images. If it is still necessary to add a second run on rows, it might be performed as illustrated in FIG. 5. The input image 1031 of the first gray level image filtering 1030 is sent to a 1×3 pixel median filter 1032 and to a 3×1 pixel median filter 1033, both filters working in parallel. The filtered image 1035 is then calculated by averaging the outputs of the two filters 1032 and 1033. In other words the first gray level image filter 1030 advantageously comprises a smoother 1034, i.e. a low-pass averager for restoring the monotonicity of the real touches.

The filtered image 1035 is then the input of the mean subtraction block 1040, or baseline image subtraction block. This subtraction is performed for obtaining an image which contains only touches (and residual noise). When using the multi-touch device on the upper face, true touches result generally in lower gray-level values than the ones of the baseline or zero-touch reference image. Therefore, the output 1035 from the first gray-level filtering block 1030 $I_{filtered\_1}$ is subtracted from the baseline image $I_{ref}$ at block 1040, according to the following formula:

$$I_{sub} = I_{ref} - I_{filtered\_1}$$

$I_{sub}$ is then a signed image with the true touches mainly positive and the ghost touches mainly negative. Noise will be present with both positive and negative amplitude and might lead to false positives around not completely filtered ghosts.

In order to reduce appearance of false positives the signed image $I_{sub}$ is sent to a second gray filtering block 1050 and filtered with a mask, for example a 3×3 pixel weighted averaging as follows:

$$I_{filtered\_2} = H * I_{sub}$$

where H is a square matrix, for example $$H = \begin{pmatrix} h_{11} & h_{12} & h_{13} \\ h_{21} & h_{22} & h_{23} \\ h_{31} & h_{32} & h_{33} \end{pmatrix} = \begin{pmatrix} 0.0113 & 0.0838 & 0.0113 \\ 0.0838 & 0.6193 & 0.0838 \\ 0.0113 & 0.0838 & 0.0113 \end{pmatrix}$$

$$\Leftrightarrow I_{filtered\_2}(k, l) =$$
$$h_{11} I_{sub}(k-1, l-1) + h_{12} I_{sub}(k, l-1) + h_{13} I_{sub}(k+1, l-1) +$$
$$h_{21} I_{sub}(k-1, l) + h_{22} I_{sub}(k, l) + h_{23} I_{sub}(k+1, l) +$$
$$h_{31} I_{sub}(k-1, l+1) + h_{32} I_{sub}(k, l+1) + h_{33} I_{sub}(k+1, l+1)$$

k and l are respectively the row and the column indexes of each pixel and the symbol * designates the convolution of Isub with H.

$I_{filtered2}$ is again a signed image. The low-pass filter coefficients $h_{11} \ldots h_{33}$ are obtained by sampling a 2D Gaussian kernel in the domain $$[-2,-2] \times [2,2] \text{ with } \sigma = 1.$$

Figure 6:
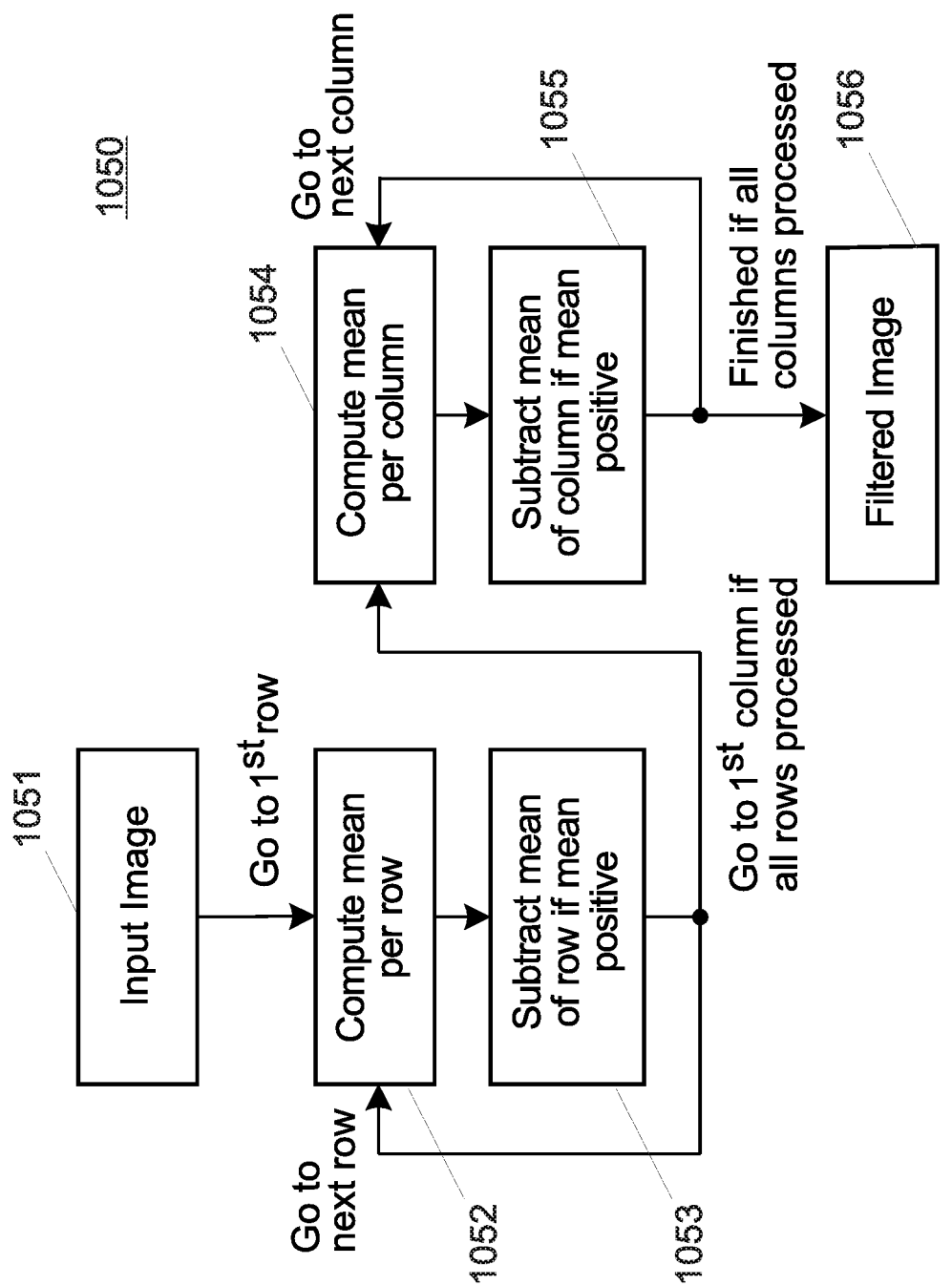
FIG. 6 illustrates one embodiment of the second gray level image filtering step of the method according to one embodiment of the invention.

Internal and external noise sources introduce a large shift of the pixels' average per row and/or column as a random non-stationary function of time. It is therefore difficult to filter this type of perturbation by conventional filtering techniques. Since the average of almost a complete row and/or column may be shifted at once, the process can be reversed and it is possible to compute and subtract the average or mean per row and/or column as shown in FIG. 6, which illustrates a special purpose row/column filter. For each row of the input image 1051 of the second gray level filtering block 1050 a mean per row is computed (1052) and, if it is positive, it is subtracted to the current row (1053). After processing all rows, the same applies to the columns: for each column of the input image 1051 a mean per column is computed (1054) and, if it is positive, it is subtracted to the current column (1055). After processing all columns, a filtered image 1056 is then obtained, which is still signed. It will then be converted again to an unsigned image 8000 by rectification, i.e. negative values are set to zero.

The output 8000 from the special purpose filter is quite clean, i.e. it contains many pixels corresponding to the true touches or background and only a few pixels corresponding to noise and false positives. This processed image is then sent to the segmentation plus analysis block 2000. Therefore, binary image segmentation 2010 is achieved by simple thresholding with a low, constant threshold:

$$I_{TH}[k, l] = \begin{cases} 1 & \text{if } I_{TH}[k, l] \geq th \\ 0 & \text{otherwise} \end{cases}$$

The threshold th may be set between 0.005 and 0.01 of the full range, e.g. between 64 and 512 for 16-bit data. The segmented image is binary.

Effective binary image filtering 2020 can be performed by binary morphological filtering. In particular the morphological opening operator preserves the pixels which match a structuring element, i.e. a group of pixels having a predetermined shape, and sets to zero the remaining pixels. In other words a structuring element is a pattern or a shape mask for filtering with respect to the form/shape and not with respect to gray-level/intensity.

As shown in FIGS. 7A to 7C, a binary morphological opening operator 2023 is defined as morphological erosion 2021 followed by morphological dilation 2022. Erosion 2021 can be implemented by applying an AND operator on the pixels of the input image of this block covered by the structuring element ("filter mask"), and setting the center pixel of the structuring element to the final result. Dilation 2022 can be implemented by applying an OR operator on the pixels covered by the structuring element and setting all covered pixels to the result. Finally, the opening operator 2023 can be easily obtained by applying an AND operator on the covered pixels and setting them to the result.

An easy choice for the structuring element might be a 2×2 pixels square which requires one morphological opening pass. "One pass" means that each pixel of the image to be filtered is passed or filtered one time in order to obtain the filtered image. "Two passes" means that the image is filtered a first then a second time to obtain the final image. The expression "one morphological opening pass" means that the whole image is filtered exactly once in order to obtain the final output, in contrast to the method using four different structuring elements and thus, four passes as illustrated in FIG. 8.

Figure 8:
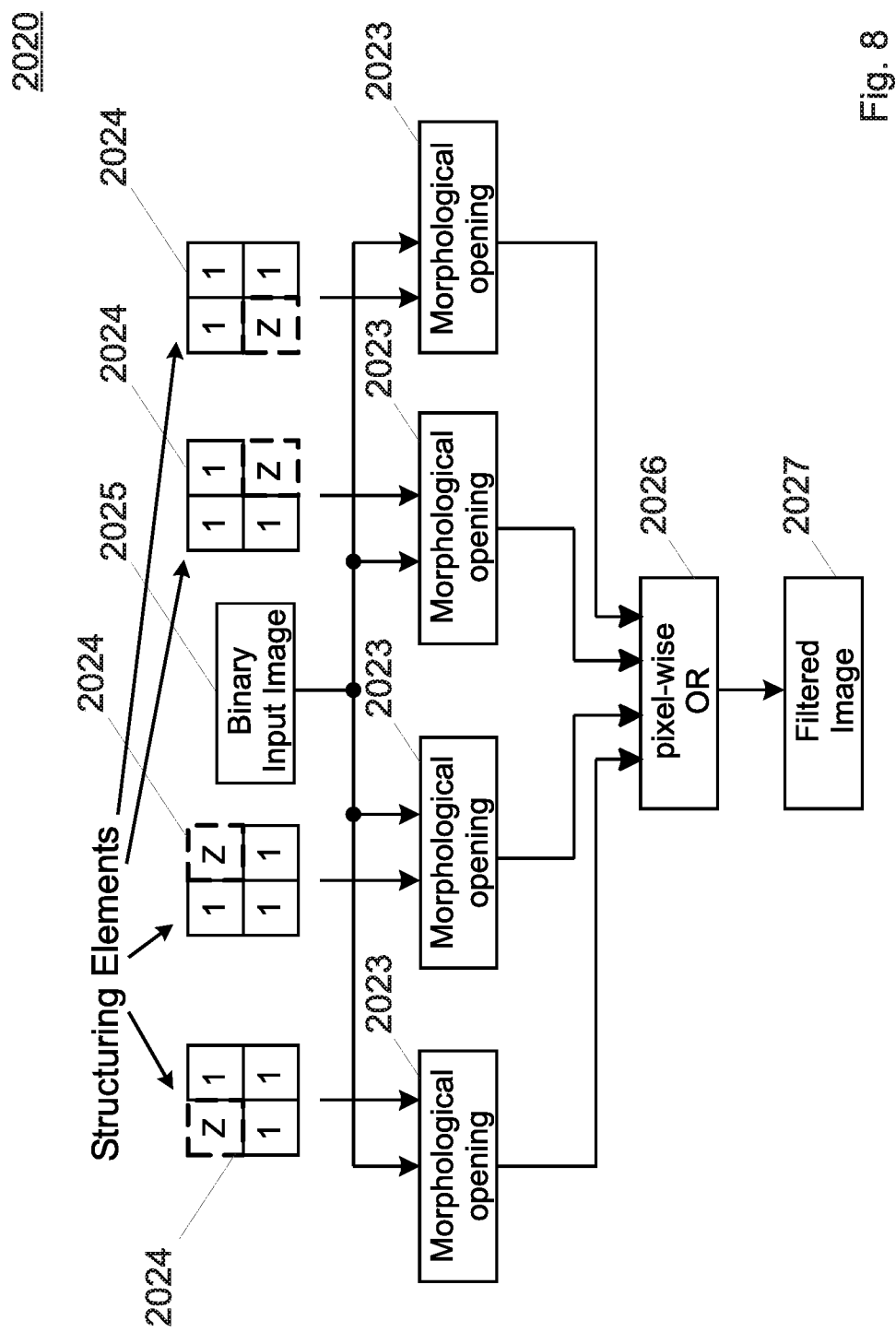
FIG. 8 shows one embodiment of the binary image filtering step by using a morphological filtering with four different 2×2 square pixel structuring elements.

FIG. 8 shows the most effective filtering for touch detection: there are four independent runs or different passes of morphological opening filtering 2023 with four structuring elements 2024, and then a pixel-wise OR operator 2026 is applied on the resulting images of the four independent runs 2023 in order to obtain a filtered image 2027. The reference "Z" in the structuring element matrix 2024 means that it is not part of the structuring element itself (it is neither 0 nor 1). A structuring element can have any shape but, since in image processing rectangular matrices are used for storing, some predefined symbol like "Z" for the pixels which are not making up the structuring element are used in order to represent for example a L-like shape.

The region labeling step 2030 is performed for identifying regions. In this context a region is defined as an area of four-connected pixels. Neighbouring pixels are labeled with the same ID if they are four-connected, and therefore belong to the same region. For example four pixels belong to the same region if they are neighbours on the same row or on the same column. Region labeling algorithms are well known in the literature.

For validating or rejecting a region (step 2040), the following properties for each region are computed:

Width of the region surrounding rectangle=$k_{max}-k_{min}+1$
($k_{min}$ and $k_{max}$ are the smallest and biggest column indexes of the region)
Height of the region surrounding rectangle=$l_{max}-l_{min}+1$
($l_{min}$ and $l_{max}$ are the smallest and biggest row indexes of the region)
Square shapedness factor=min(width$_R$,height$_R$)/max(width$_R$,height$_R$)
Area in pixels
L1 norm (sum of all the pixels corresponding to the region)
($k, l, z_{max}$) of the regional maximum where $z_{max}$ is the value (intensity) of the regional maximum, i.e. the biggest maximum of the region, or the intensity of the local maximum if there is more than one maximum in the region.

As discussed with reference to the FIGS. 3A and 3B, the method comprises the finding and counting the number of local maxima of size one pixel on a sub-region inside each region. In a preferred embodiment this sub-region is of size 3×3 pixels.

Some regions are then discarded according to predetermined conditions, based on their area, their square shapedness factor and the number of the found local maxima.

In one embodiment a local maximum is discarded if the accumulated sum of the pixels contained on the 3×3 sub-region centred on the local maximum is inferior to a predetermined threshold.

It is quite likely that a region is a false-touch region, if one of the following conditions is met:
Area<Area$_{min}$
Area>Area$_{max}$
Square shapedness factor<7/12 (~0.6) experimentally
Number of local maxima>5 or <1
The value of the Area$_{min}$ and Area$_{max}$ are experimentally determined and depend on the physical capacitor size.

It is very likely that a big object is on the multi-touch device (or that the multi-touch device provides useless data), if there is one of the following conditions:
largest area>2 Area$_{max}$ (or >~10% of total image area)
number of rejected areas>2 (experimentally, or e.g. 2 thumbs holding the panel)
The gravity or geometric center ($x_c$, $y_c$) of the remaining regions is then computed. As discussed, if a region contains one local maximum of size one pixel, the touch position is determined by computing the geometric center of this region using the coordinates of all the pixels of the region. If there are more than one local maxima of size one pixel, only the coordinates of the 9 pixels inside the sub-regions centred in each local maximum are considered for the geometric center computation. The geometric center computation is known from literature and can be achieved for example as follows:

$$x_c = \frac{\sum_{(x,y) of\ region\ pixels} x I_{filtered\ 2}(x, y)}{\sum_{(x,y) of\ region\ pixels} I_{filtered\ 2}(x, y)}$$

$$y_c = \frac{\sum_{(x,y) of\ region\ pixels} y I_{filtered\ 2}(x, y)}{\sum_{(x,y) of\ region\ pixels} I_{filtered\ 2}(x, y)}$$

In a further data processing improvement, if a large object is on the multi-touch device, it is likely that it will remain in a few—up to many thousands—of frames. Therefore, the result of image validation/rejection will be stored in a false touch image history bit-FIFO. If all bits in the FIFO are FALSE, the ($x_c$, $y_c$, $z_{max}$) of the valid touches/regions are transferred to the tracking part, otherwise the method can stop and continue by acquiring the next frame (and maybe to run at lower frequency).

The aim of the tracking part for multi-touch methods is mainly to maintain the correct identities of detected touches as long as they remain on the multi-touch device. A secondary but not less important aim is to suppress false positive touches, i.e. touches which are detected as true touches, but not physically present on the multi-touch device. A third goal is to gather space-time consistent trajectories. This is intrinsically linked with maintaining the correct identities. Once space-time consistent trajectories are available, filtering, smoothing or analysis of trajectories of any complexity will be possible. Thus, space-time consistent trajectories will enable rich user input possibilities and functionality.

Figure 9:
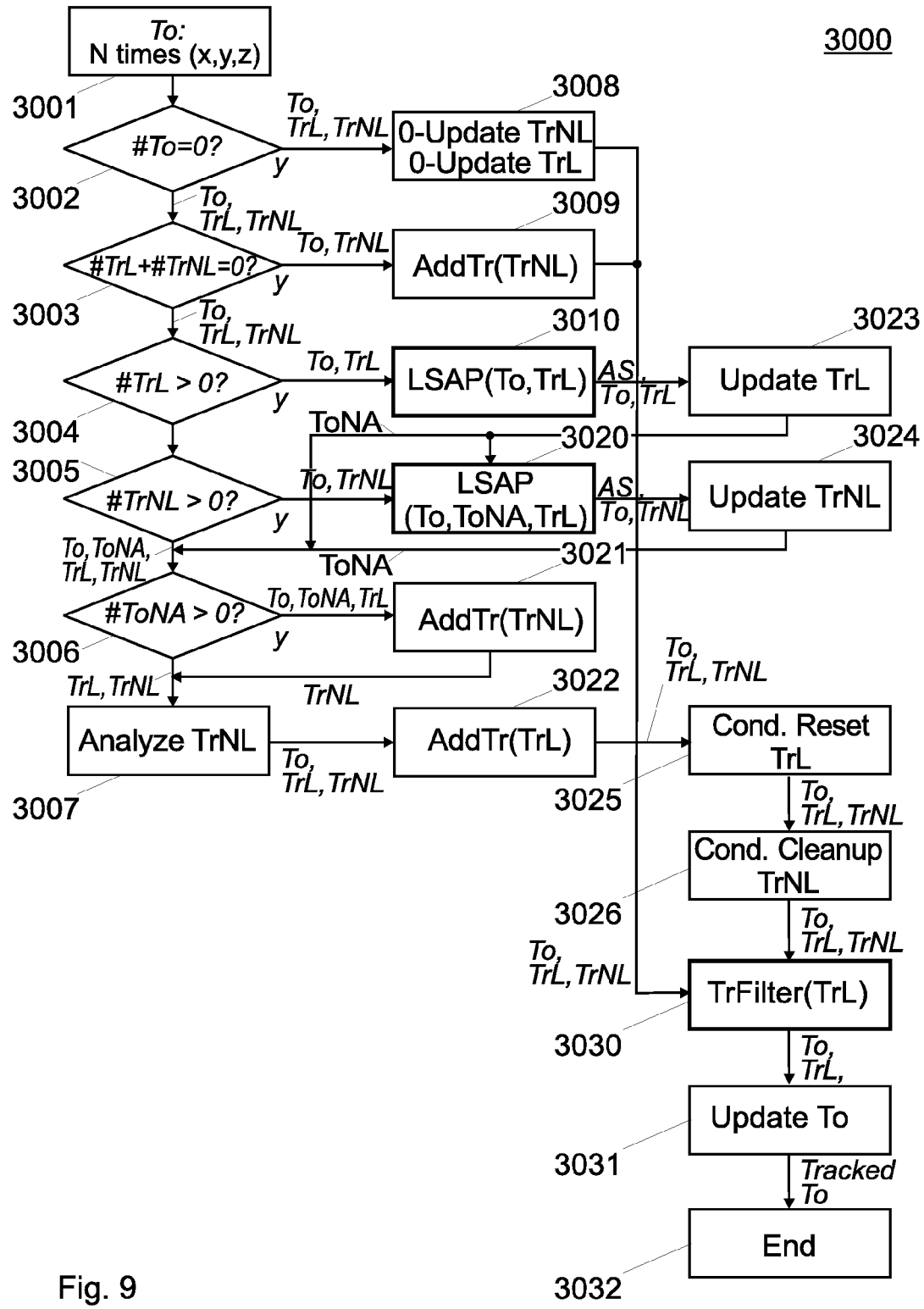
FIG. 9 shows a flowchart of the tracking steps of the method according to one embodiment of the invention.

Since the input 9000 of the tracking part of the method is sparse (N touch coordinate vectors), sparse tracking techniques can be applied. If the raw input images 7000 of the whole method would be very clean, simple means could be used to perform the association: nearest neighbour (distance based), nearest neighbour standard filter (statistics/state based) etc. But for a usual multi-touch device, the strongly corrupted input data leads to appearance of many false positives and to possible loss of true targets during multiple frames. Therefore, it is proposed to solve linear sum assignment problems (LSAP) in order to match robustly new touches to existing trajectories. Using LSAP for sparse (and even for dense) data association is well known in literature. The complete tracking part of the proposed method is shown in FIG. 9.

For each found trajectory there is an assignment status bit FIFO. There are two types of trajectories:

Unlabeled trajectories (TrNL): contain false positive and true target trajectories. An unlabeled trajectory has an ID, an associated assignment status bit FIFO and (x, y, z) of the last successful assignment.

Labeled trajectories (TrL): (should) contain only true target trajectories. A labeled trajectory has an ID, an associated assignment status bit FIFO and a (x, y, z) trajectory FIFO of length K for the last K successful assignments.

Having two types of trajectories allows suppressing false positives by accumulating touches in unlabeled trajectories (3020) if assignment with labeled trajectories has not been successful. Once an unlabeled trajectory has been assigned successfully several times it will become labeled, otherwise it will be deleted. Finally, only labeled trajectories will be used for output (3030).

For each input touch, the block adding a trajectory 3009 creates a trajectory as follows:

Complete assignment status FIFO is reset to FALSE
ID is the current available ID; current ID is incremented after trajectory creation
For unlabeled trajectories (x, y, z) are simply set to (x, y, z) of the detected touch
For labeled trajectories, the complete trajectory FIFO is set to zero and (x, y, z) of the detected touch is inserted to the FIFO.

A zero-update trajectory block 3008 is executed if there are no touches detected, respectively if the complete input image is rejected. The block inserts FALSE to the assignment status FIFO for each trajectory which is present (labeled and unlabeled trajectories).

The update labeled trajectory block 3023 receives an assignment vector. The index of an element of the vector corresponds to the trajectory ID of the trajectory to be updated. The value of an element of the assignment vector corresponds to the index of the touch to be inserted to the trajectory or to NOT_ASSIGNED which means that the corresponding trajectory is not updated/assigned to a touch. A similar block 3024 updates unlabeled trajectories. The blocks 3002 to 3006 are decisional blocks allowing analysing all touches and all labeled and unlabeled trajectories.

A conditional reset trajectories 3025 occurs if the reset condition is satisfied: all selected trajectories will be deleted. In general, a reasonable reset condition is if every bit of every status FIFO buffer of the selected trajectories is FALSE, which means that there has been no successful assignment for any of the selected trajectories during K frames, wherein K corresponds to the length of the FIFO buffer. For labeled trajectories, it is wise to delete all trajectories at once to guarantee trajectory ID consistency for future assignments.

The conditional cleanup trajectories 3026 is implemented similarly as the conditional reset 3025 but with the difference that only one specific trajectory assignment status FIFO is analyzed and if all bits are FALSE, only this specific trajectory will be deleted. Depending on the implementation, deleting a trajectory might not guarantee trajectory ID consistency (which is not important anyway for unlabeled trajectories).

The assignment status FIFOs of unlabeled trajectories are analyzed at block 3007 connected to the block 3021 which managed new unlabeled trajectories. If a sufficient condition applies for a specific unlabeled trajectory, a new labeled trajectory will be created (3022) and the first entry of the trajectory FIFO will be initialized with (x, y, z) of the specific unlabeled trajectory. The unlabeled trajectory will then be deleted. A sufficient condition might be if the number of TRUE bits is greater than a certain threshold number T. This means that an unlabeled trajectory has been successfully associated for more than T frames during the past K frames, where K is the size of the FIFO buffer.

The labeled trajectories are then filtered (3030) for their time-space coherence and consistency. Based on the filtered trajectories, some parameters can be updated (3031) as will be discussed.

Trajectory filtering 3030 can be performed by using Kalman filtering. However, in the used system a Kalman filter does not provide sufficient smoothness. Therefore Kalman smoothing could be used but it is not a good option for real-time implementation. Nevertheless, a sufficient and satisfying smoothness can be applied by simple moving average low pass filter with a constant number of samples, for example:

$$x_f[k] = (x_f[k], y_f[k], z_f[k])$$

$$= \frac{1}{N} \sum_{i=0}^{N-i} x[k-i]$$

It is found experimentally, that there are only three good choices for N in the employed multi touch system:

N=2. Least smooth, quick response. Gives the feeling that the output corresponds well to the finger movement. Leaves occasionally some impressions of not perfectly filtered trajectories.

N=3. Quite smooth, acceptable response. Gives a smooth impression. But one might notice a (still acceptable) delay.

N=4. Very smooth, slow response. Though this results in a very smooth trajectory, the fact of computing the average up to three frames in the past results in a slow response.

N=1 means no filtering. Furthermore, the choice of N clearly depends on the frequency at which the method is operated and it might be wise to choose N much higher if the frequency is significantly increased.

The linear sum assignment problem (LSAP) 3010, 3020 is a classical problem in combinatorial optimization and therefore known. In its original form it is stated as follows:

Given a (square) matrix C of size N×N whose elements are 0 or positive, find exactly 1 element per row and column such that the sum of the N found elements is the smallest possible.

It is also known that LSAP can be used to solve the data association problem for multi-target tracking if the cost matrix C is filled with some kind of distance or inverse likelihood measure of matching trajectories to targets.

In its original form as stated above the solution requires N! sum computations and comparisons and has therefore exponential runtime. There are known algorithms to solve the problem in $O(n^3)$ in the very worst case.

For the multi-touch tracking the Munkres algorithm is used to solve LSAP since it is easily extended to rectangular matrices (number of trajectories not forcibly the same as number of touches) and because it allows soft-gating, i.e. do not allow certain assignments in advance, to be implemented easily.

Since unlabeled trajectories are primarily destined to suppress false positives, the cost matrix for the LSAP of unlabeled trajectories and touches can be simply a distance matrix with soft-gated distances:

$$C(TrNL, To) = \begin{pmatrix} D_{SG}(TrNL_1, To_1) & \cdots & D_{SG}(TrNL_1, To_n) \\ \vdots & \ddots & \vdots \\ D_{SG}(TrNL_m, To_1) & \cdots & D_{SG}(TrNL_m, To_n) \end{pmatrix}$$

TrNL$_i$ means (x, y) of unlabeled trajectory i. To$_j$ means (x, y) of touch j.
The soft-gated distance measure DSG is given by:

$$D_{SG}(TrNL_i, To_j) = \begin{cases} dist_2(TrfNL_i, To_j) & \text{if } dist_2(TrNL_i, To_j) < D_{max} \\ \infty & \text{otherwise} \end{cases}$$

$$dist_2(TrNL_i, To_j) = \sqrt{(x_{TrNL,i} - x_{To,j})^2 + (y_{TrNL,i} - y_{To,j})^2}$$

Infinite distance $\infty$ means NOT_ALLOWED assignment. In implementation, NOT_ALLOWED might be the highest value of the employed numerical range (e.g. NOT_ALLOWED=0xFFFF if the cost matrix is computed on 16 bits).

$D_{max}$ is the gate distance. For unlabeled trajectory assignment, a constant gate distance can be used. This gate distance might be evaluated experimentally and/or by reasoning on its implications on the maximum (physical) displacement possible between two successive frames, i.e. the maximum physical finger velocity, given the physical capacitor size.

In one preferred embodiment $D_{max}=3$, which allows a maximum displacement of ~2 cm (physical capacitor size is ~7×7 mm$^2$) between two successive frames.

Figure 10:
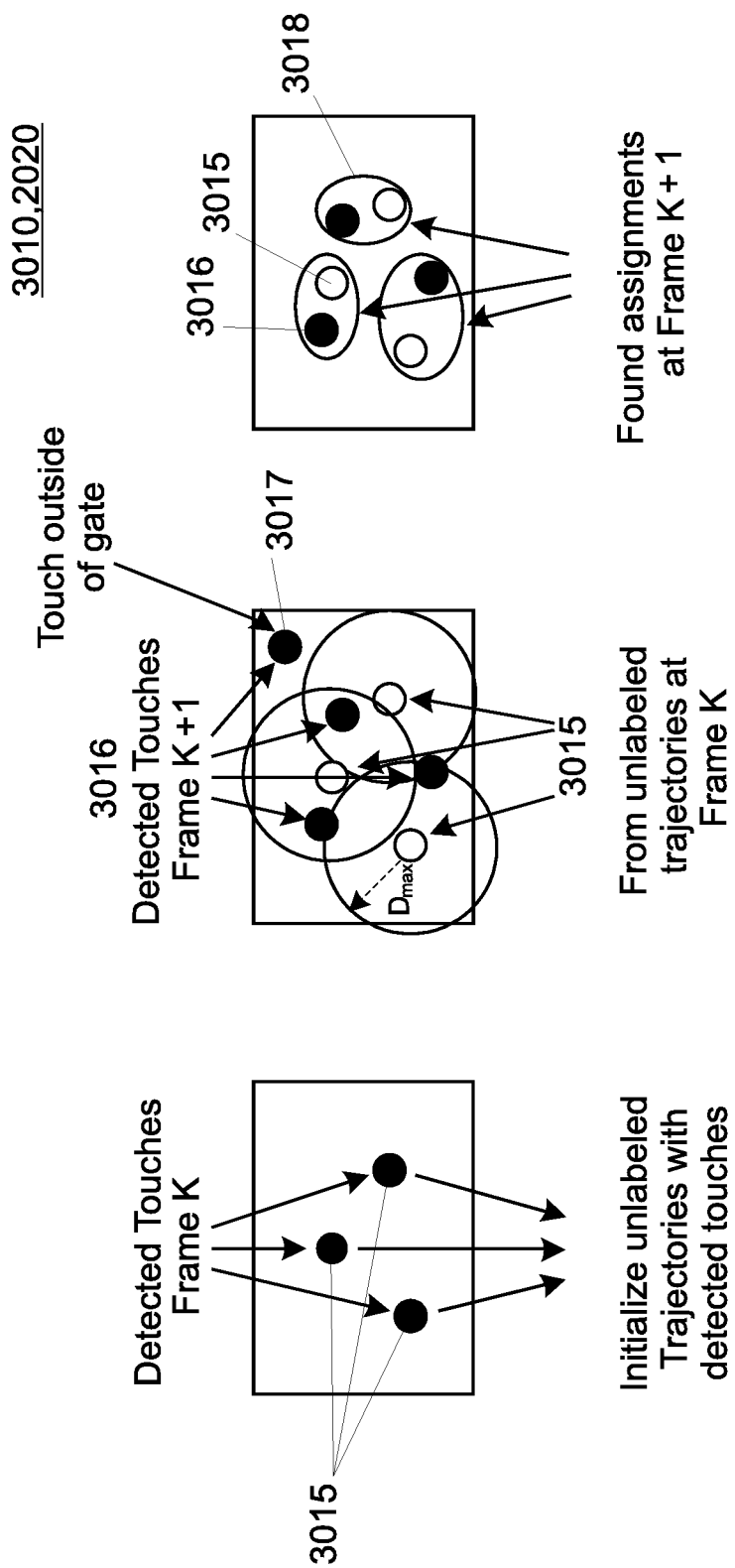
FIG. 10A to 10C show an example of multi-touch tracking with Linear Sum Assignment Problem (LSAP) and soft-gating illustration according to one embodiment of the invention.

FIG. 10A shows three detected touches 3015 at frame K, which allow to initialize unlabeled trajectories. FIG. 10B illustrates the detected touches 3015 at frame K and the detected touches 3016 at frame K+1. A touch outside of soft-gate 3017 is determined, since it is not comprised in the shown circles having radius $D_{max}$ (gate distance). In FIG. 10C assignments 3018 are found at frame K+1.

The cost matrix C for matching labeled trajectories to touches is basically the same as for unlabeled with the following differences:

If there are less than four samples available in the trajectory, the concerned elements of the cost matrix are calculated in the same way as for unlabeled trajectories.

If (more than) four samples are available, the mean velocity module on the (newest) four samples is computed (mean of 3 approximated instant velocity values).

If the mean velocity module<1, the concerned elements of the cost matrix are calculated in the same way as for unlabeled trajectories.

Figure 11:
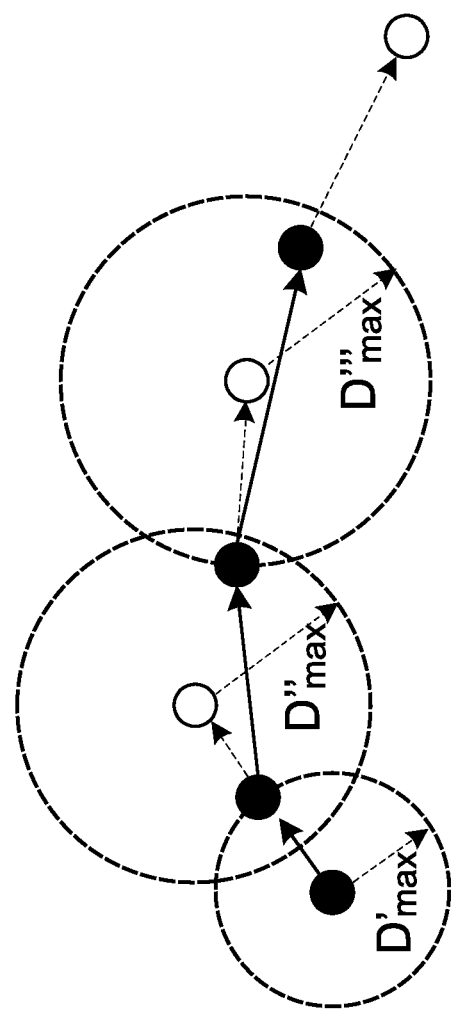
FIG. 11 shows an illustration of the change of the gate distance and assignment by using predicted touch positions for large displacements according to one embodiment of the invention.

If the mean velocity module>=1, the following steps are performed:

mean relative change of direction on the (newest) four samples is computed (mean of three approximated instant velocity values)

based on mean velocity module and mean relative change of direction, a touch position will be predicted as follows:

$$x_{p,i}[k] = x_{TrL,i}[k-1] + \text{mean}\|v_{TrL,i}\|\cos(\text{mean}\Delta\Phi_{TrL,i})$$

$$y_{p,i}[k] = y_{TrL,i}[k-1] + \text{mean}\|v_{TrL,i}\|\sin(\text{mean}\Delta\Phi_{TrL,i})$$

the gate distance is set (increased) to:

$$D_{max,new} = \text{mean}\|v_{TrL,i}\|D_{max}$$

cost matrix elements of the concerned trajectory (where mean velocity module>=1) will be computed with respect to the predicted position and soft-gating is performed with the increased gate distance These differences allow having large displacements (fast movement) without being less immune to false positives since the position for large displacements is predicted. FIG. 11 illustrates the change of gate distance ($D'_{max} < D''_{max} < D'''_{max}$) and assignment using predicted touches positions for large displacements.

The following holds in principle for both cost matrix computations (for unlabeled and labeled trajectories), but due to the tracking method setup, it only holds for unlabeled trajectories.

It has to be kept track of which touches are assigned successfully after the first LSAP 3010 (labeled trajectories with touches), when computing the cost matrix for the second LSAP 3020 (unlabeled trajectories with touches).

Elements for a touch that has already been assigned are simply set to infinite (NOT_ALLOWED). This will guarantee that a touch will never be assigned twice.

The tracking part of this method in other words means data association (LSAP) and filtering.

The final output 3032 of the tracking method will be N times (ID, N, x, y, z) where N is the number of labeled trajectories whose assignment status FIFOs fulfil a certain condition. A reasonable condition might be that at least one in the assignment status FIFO is 1 (true). This guarantees that a labeled trajectory is output even if it is lost during K−1 frames where K is the length of the status FIFO. ID is the identity of the corresponding trajectory and (x, y, z) are the outputs of a trajectory filter. The touch coordinates (x, y) and the touch intensity z are both not related to a specific finger.

Figure 12:
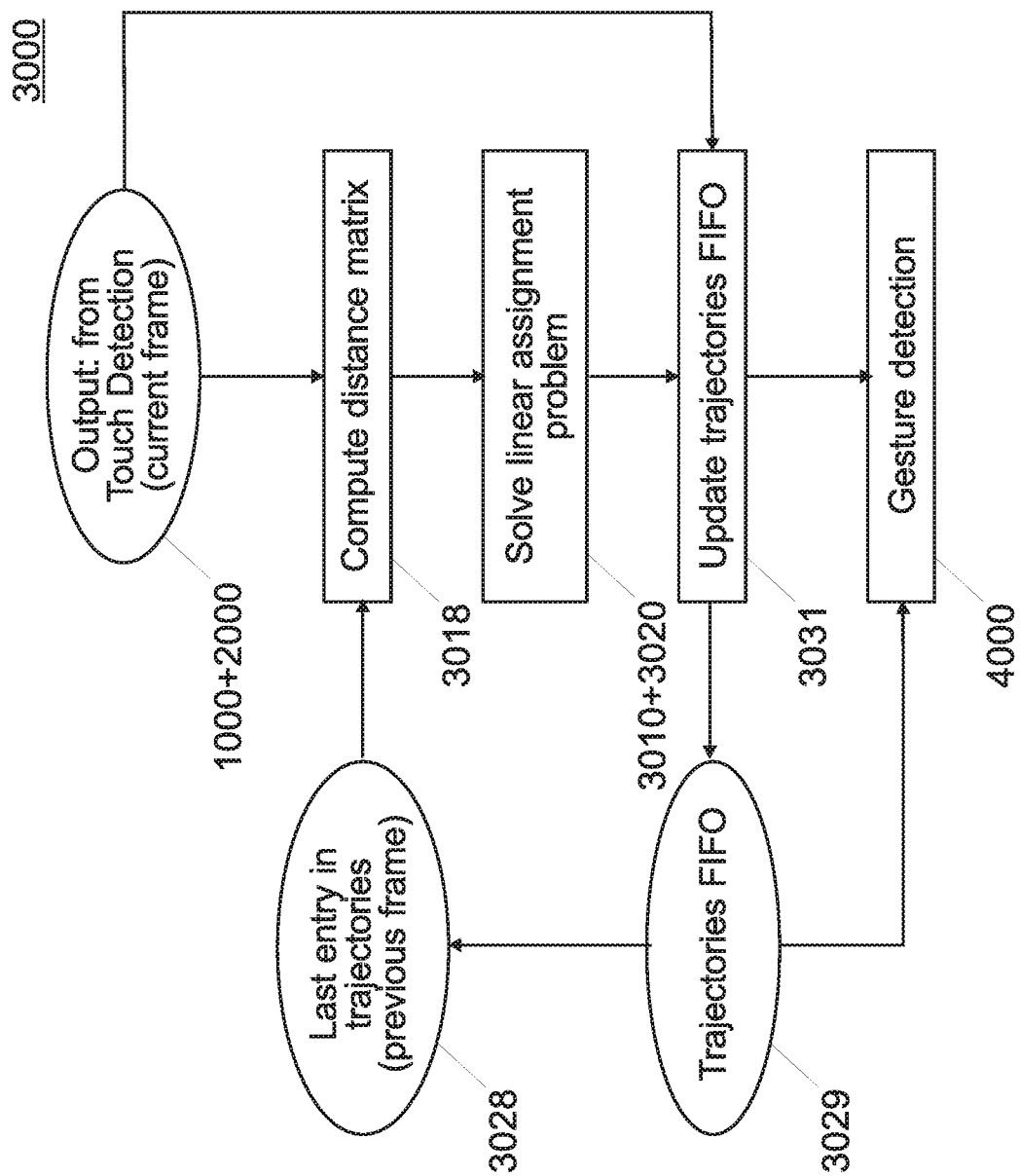
FIG. 12 illustrates a simplified flowchart containing the main steps of the tracking part according to one embodiment of the invention.

FIG. 12 illustrates a simplified flowchart containing the main steps of the tracking method according to one embodiment of the invention. Based on the output from the touch detection part 1000+2000 (current frame), a distance matrix is computed (3018), containing distances between the detected position of the current frame and predicted positions. In another embodiment a likelihood matrix is computed instead of the distance matrix. This matrix contains an estimation of the joint-likelihood of four parameters (states):
- distance
- change in the velocity module
- change in movement direction
- change in intensity.

A linear assignment problem (3010, 3020) is then solved. It represents a good choice for tracking without pattern matching and does suffer from track-loss even in the presence of large displacement (fast movements) and discontinuities.

After a filtering not shown, the trajectories FIFO 3029 are updated (3031) and the computation of the matrix 3018 restarts based on the last entry in the trajectories (3028).

Figure 13:
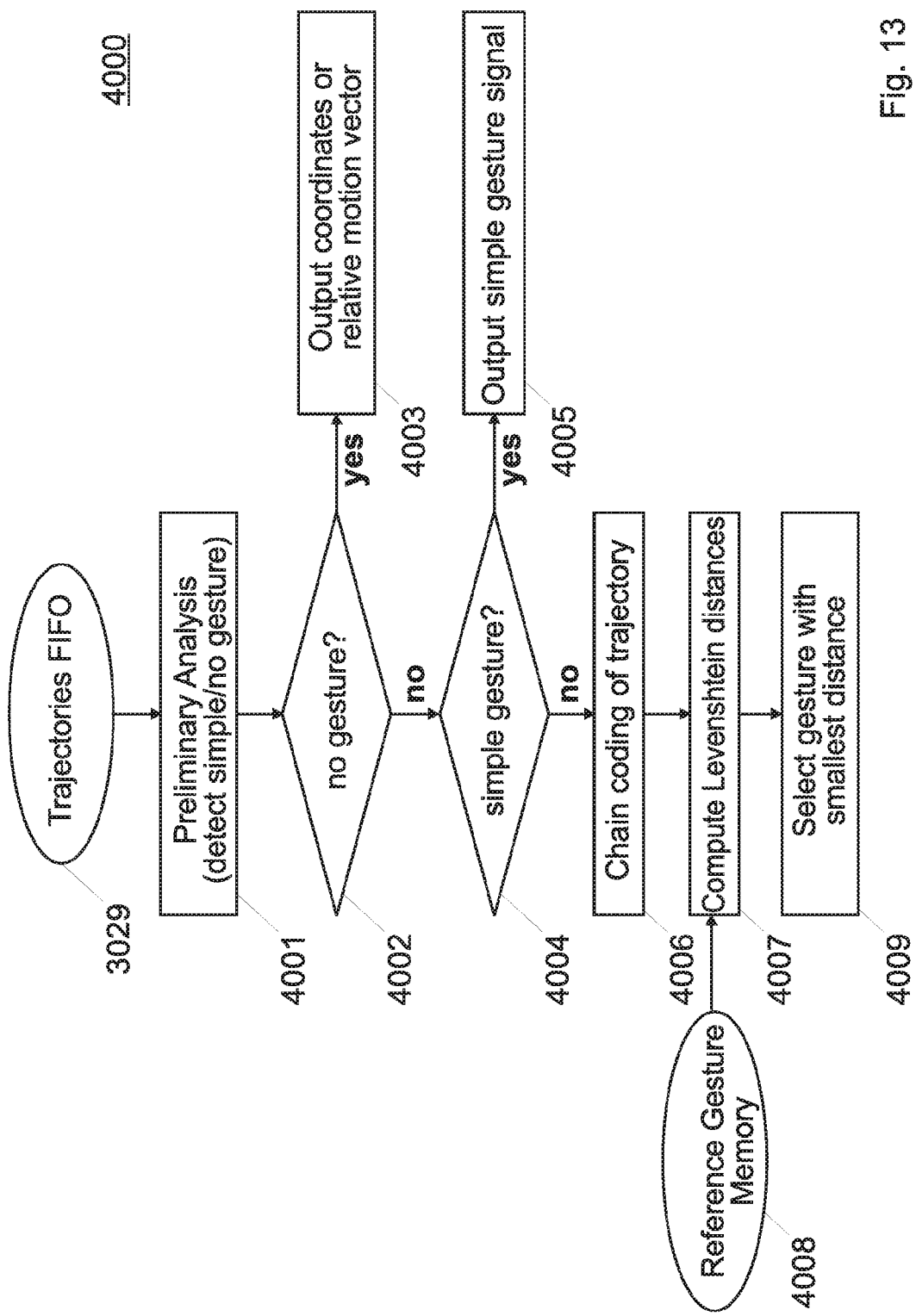
FIG. 13 illustrates a flowchart containing the main steps of the gesture recognition according to one embodiment of the invention.

FIG. 13 illustrates a flowchart containing the main steps of the gesture recognition 4000 according to one embodiment of the invention. In the case of simple gestures, an analysis of the trajectories is performed. In the case of complex gestures, a robust comparison against reference gesture trajectories stored in memory is performed.

A preliminary analysis 4001 on the trajectories FIFO 3029 allows to detect simple or no gesture. If there is no gesture (4002), the coordinates or the relative motion vector is outputted (4003). If there is a simple gesture (4004), a simple gesture signal is outputted (4005). If there is not a simple gesture, the following steps are performed:
- chain coding of trajectory (4006)
- computing Levenshtein distances (4007) with respect to the reference trajectories (4008)
- Selecting gesture with smallest distance (4009).

The proposed gesture recognition is flexible, since it is possible to recognize any kind of gesture with any kind of fingers.

With the method as described above, touches are detected and tracked as long as they remain on the multi-touch device, even if they are not in movement. However, software keyboard applications require input only from a tapping finger and not from those which lie on multi-touch device. With the following steps, which have to be applied to the method of FIG. 2, it is possible to realize N-finger soft-keyboard applications, for example a 10-finger soft-keyboard application, where the hands are allowed to remain on the multi-touch device:

Instead of feeding the output of the second gray level filtering block 1050 (F(k): frame at t=k) into image segmentation 2010, frame at t=k is stored and the method is repeated from the beginning.

One instance later, a second frame is obtained (F(k+1): frame at t=k+1).

Discrete time derivative is computed: dF(k+1)=F(k+1)−F(k).

The time derivative is rectified, i.e. set to zero for pixels which would be negative.

dF is fed into the remaining steps to obtain (ID, N, x, y, z)

The process of computing the time derivative will remove information which is quasi-constant in time and will leave an image which only contains dynamic information. Therefore, dF will be zero where hands or fingers are resting on the multi-touch device and it will be different from zero where a finger is tapping. Further processing might needed to be adapted to only allow pulses (no movement), only allow one touch per frame etc.

If the derivative image is too poor, the tap information can be extracted as well after the tracking block 3000 for normal execution of the method by analysis of the trajectory and assignment status buffers.

The methods and processing steps described in the present application may be performed by a software executed by a general purpose processor or by a digital signal processor (DSP), by an application specific integrated circuit (ASIC), by a field programmable gate array (FPGA), by discrete components or any combination thereof. Different hardware and/or software components may be used for performing the functions of the different blocks, and even with a single block.

Any steps of a method according to the present application may thus be embodied in hardware, in a software module executed by a processor, or in a combination of the two. The software may include a firmware, a hardware driver run in the operating system, or an application program. Thus, the invention also relates to a computer program product for performing the operations presented herein. If implemented in software, the functions described may be stored as one or more instructions on a computer-readable medium. Some examples of storage media that may be used include random access memory (RAM), read only memory (ROM), flash memory, EPROM memory, EEPROM memory, registers, a hard disk, a removable disk, other optical disks, or any available media that can be accessed by a computer or any other IT equipment and appliance.

The invention claimed is:

1. A method for detecting an arbitrary number of touches from an input image delivered by a multi-touch device, said method comprising the following steps:
   - processing at a processing device said input image and obtaining a processed image;
   - segmentation at the processing device by thresholding of said processed image and obtaining a segmented image;
   - identifying at the processing device regions of the segmented image;
   - finding local maxima at the processing device, each local maximum being of size one pixel and belonging to a sub-region of size N×N pixels, wherein N is an odd integer number;
   - wherein said finding comprises a plurality of iterations where at each iteration:
     - a said sub-region is defined, said sub-region being centered on one pixel of a region, said pixel being changed at each iteration;
     - verifying whether the pixels inside said sub-region, other than the pixel in the center of said sub-region, have a value lower than the value of said pixel in the center of said sub-region;
     - if the previous step is verified, identifying said pixel in the center of said sub-region as a local maximum of size one pixel;
   - discarding at the processing device some regions according to predetermined conditions;
   - determining at the processing device at least one touch position based on said local maxima by computing a geometric center of each region that remains after said discarding, wherein said computing takes into account all the pixels of a region if said region contains one local maximum of size one pixel, and wherein said computing further takes into account only the pixels inside the sub-regions centered in each local maximum of a region if said region contains more than one local maxima of size one pixel.

2. The method claim 1, wherein N is equal to three.

3. The method of claim 1, wherein said region is a group of connected pixels.

4. The method of claim 1, wherein said processing comprises filtering said input image.

5. The method of claim 1, wherein said predetermined conditions are based on the area, the square shapedness factor of said regions and/or the number of the local maxima of size one pixel found in each region.

6. The method of claim 1, comprising a calibration step for obtaining a baseline image.

7. The method of claim 6, comprising subtracting said input image with said baseline image, obtaining a signed image and finding false touches.

8. The method of claim 4, wherein said filtering comprises a first gray level image filtering.

9. The method of claim 8, wherein said first gray level image filtering comprises a smoother.

10. The method of claim 4, wherein said filtering further comprising a time-domain filtering of said input image.

11. The method of claim 4, wherein said filtering further comprising a first gray level image filtering.

12. The method of claim 4, wherein said filtering further comprising a binary image filtering.

13. The method of claim 12, wherein said binary image filtering comprises a binary morphological filter.

14. The method of claim 1, wherein said identifying regions comprising region labelling and the analysis of said regions.

15. The method of claim 1 further comprising the following steps:
creating trajectories based on said touches positions;
for each trajectory, assigning a status bit identifying each trajectory as assigned or not assigned;
solving a linear assignment problem of each labeled trajectory;
solving a linear assignment problem of each unlabeled trajectory and updating the labeled trajectories; and
filtering said updated labeled trajectories.

16. The method of claim 15, wherein creating a trajectory for each of said touches positions comprising computing a distance matrix.

17. The method of claim 16, wherein creating a trajectory for each of said touches positions comprising computing a likelihood matrix, taking into account the followings parameters: position, velocity module, change in direction, and change in intensity.

18. The method of claim 17, comprising updating said parameters based on said filtering.

19. The method of claim 1, further comprising:
a preliminary analysis for detecting a gesture or a simple gesture;
outputting the coordinates of a relative motion vector if there is not detection of a gesture;
outputting a simple gesture signal if there is detection of a simple gesture; and
performing comparison against reference gestures if there is a gesture and there is not a simple gesture.

20. A non-transitory, tangible computer readable medium having instructions executable by a processor for performing the method of claim 1 when said instructions are executed.

21. A multi-touch equipment for a multi-touch device comprising:
processing means for processing an input image output by a multi-touch device, and for obtaining a processed image;
segmentation means for thresholding of said processed image and obtaining a segmented image;
identifying means for identifying regions of the segmented image;
computation means for finding local maxima, each local maximum being of size one pixel and belonging to a sub-region;
wherein said finding comprises a plurality of iterations where at each iteration:
a said sub-region is defined, said sub-region being centered on one pixel of a region, said pixel being changed at each iteration;
verifying whether the pixels inside said sub-region, other than the pixel in the center of said sub-region, have a value lower than the value of said pixel in the center of said sub-region;
if the previous step is verified, identifying said pixel in the center of said sub-region as a local maximum of size one pixel;
said computation means discarding some regions according to predetermined conditions;
determination means for determining one or a plurality of touch positions based on said local maxima by computing a geometric center of each region that remains after said discarding, wherein said computing takes into account all the pixels of a region if said region contains one local maximum of size one pixel, and wherein said computing further takes into account only the pixels inside the sub-regions centered in each local maximum of a region if said region contains more than one local maxima of size one pixel.

* * * * *